United States Statutory Invention Registration [19]

[11] Reg. Number: H720

Lomuscio

[43] Published: Jan. 2, 1990

[54] SIMPLIFIED LETTERING SYSTEM

[76] Inventor: Andrew J. Lomuscio, 448 San Fernando Dr., Palm Springs, Fla. 33461

[21] Appl. No.: 191,426

[22] Filed: May 9, 1988

[51] Int. Cl.[4] ..... B43L 13/10

[52] U.S. Cl. ..... 33/23.04; 401/193; 401/6; 401/261; 401/267

[58] Field of Search ..... 401/261, 265, 267, DIG. 3, 401/256, 258, 260; 33/23.04

[56] References Cited

U.S. PATENT DOCUMENTS

| | | | |
|---|---|---|---|
| 293,112 | 2/1884 | Taylor | 401/261 |
| 299,046 | 5/1884 | Alderman | 401/261 |
| 1,063,962 | 6/1913 | Dunham | 401/DIG. 3 X |
| 1,333,034 | 3/1920 | Nawn | 401/267 X |
| 1,964,512 | 6/1934 | Halpern | 401/261 X |
| 2,720,030 | 10/1955 | Anderson | 33/23.04 |
| 2,796,047 | 6/1957 | Lehr | 401/267 X |
| 2,966,137 | 12/1960 | Chevillon | 33/23.04 X |
| 3,594,092 | 7/1971 | DiCarlo | 401/258 |
| 3,614,248 | 10/1971 | Otsuka | 401/265 X |
| 3,871,776 | 3/1975 | Braun | 401/261 X |

FOREIGN PATENT DOCUMENTS

| | | | |
|---|---|---|---|
| 137228 | 4/1934 | Fed. Rep. of Germany | 401/DIG. 3 |
| 2205021 | 8/1973 | Fed. Rep. of Germany | 401/258 |
| 458493 | 6/1950 | Italy | 401/DIG. 3 |
| 1051009 | 12/1966 | United Kingdom | 401/258 |

OTHER PUBLICATIONS

Letterguide product literature, 2-1957.

*Primary Examiner*—Deborah L. Kyle
*Assistant Examiner*—Michael Carone
*Attorney, Agent, or Firm*—Lewis Arnold Thaxton

[57] ABSTRACT

An improved calligraphic alphabet lettering system particularly designed to reproduce Old English characters. The lettering system consists of (a) an Old English lettering template, (b) a hand manipulable and finger contoured scriber, and (c) a rectangularly shaped chisel point pen nib. Use of this lettering system provides for variations in the thickness of the Old English characters produced.

3 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

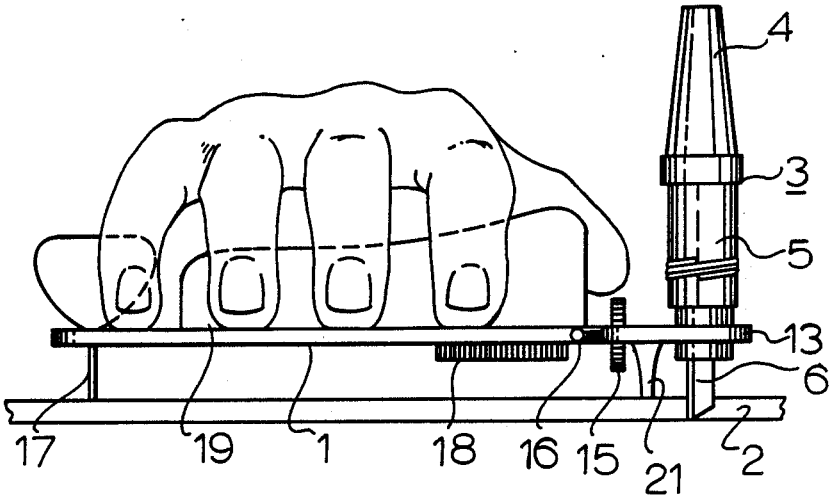
Fig. 2
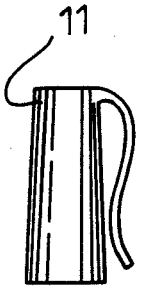
Fig. 3
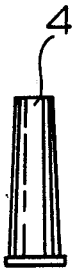
Fig. 4a
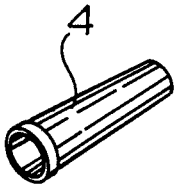
Fig. 4b
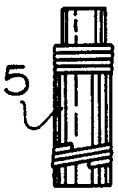
Fig. 5a
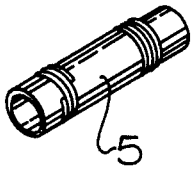
Fig. 5b
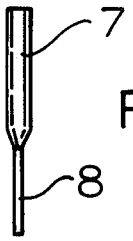
Fig. 6
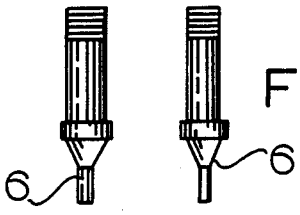
Fig. 7a
Fig. 7b

SIMPLIFIED LETTERING SYSTEM

BACKGROUND OF THE INVENTION

This invention relates to the field of calligraphy and is particularly directed to a system of reproducing Old English lettering. The use of Old English characters on various documents, i.e. Wedding Invitations, Certificates of Marriage, Academic Degrees, Religious Recordings, etc., are prevalent in our society. While many of these documents are mass produced by machine, many more are still hand crafted by calligraphers.

At present a calligrapher is required to use the conventional method of scribing Old English characters by first outlining the letters, proceeded by filling in the outlined letters with liquid ink. Such a technique is laborious, time consuming and often precipitates multiple errors.

A limited response to these disadvantages in conventional lettering instruments and techniques is set forth in U.S. Pat. No. 1,333,034, issued to P. Nawn on Mar. 9, 1920. The patentee discloses a rectangular pen nib capable of scribing thin, moderate and thick lines. M. Chevillon, in U.S. Pat. No. 2,966,137 and issuing on Dec. 27, 1960, discloses the coordinate use of lettering pens, template and scriber. In making such a synthesis, Chevillon particularly points out that his scriber can be installed "with adaptors for using ordinary pen points . . . ".

Herein resides the industry problem to date, since "ordinary pen points" have a needle-like longitudinal writing nib.

The most salient disadvantage of the prior art lettering system relates to the use of needle-like writing nibs in the production of Old English characters. As indicated above, use of needle-like nibs require the calligrapher to trace the Old English characters and later fill in the traced letters with the apposite liquid ink; such being a tedious and most time consuming multiple-step process.

It therefore, is a general object of this invention to provide an improved writing instrument system particularly suitable in readily producing Old English characters.

Another object of the present invention is to provide a writing instrument system which ensures a dependable movement of a writing nib affixed to a scriber.

A further object of the present invention is to provide a new writing nib for a scriber, the nib being essentially rectangular in shape and containing its own ink reservoir.

An additional object of the present invention is to provide a lettering system, which consists of a scriber, writing pen and template, wherein the pen nib is so designed that Old English characters are produced complete in a "one stroke" fashion.

Other objects and advantages of this invention will become more fully apparent as this description proceeds, with reference being made to the accompanying drawings and appended claims.

SUMMARY OF THE INVENTION

Accordingly, the present invention has been developed with a view toward providing an advancement in the art of pen calligraphy. The improved lettering system comprises an Old English template, a hand manipulable scriber and a chisel-point technical pen. The writing pen has a cylindrical casing including therein, an ink reservoir, a pen barrel or cylinder, a tungsten steel plunger/needle, a ridged channel for receiving the cylinder and plunger/needle, and a rectangular shaped chisel point pen nib.

The preferred method of use for this invention is provided by placing an Old English template onto a receiving surface. A hand manipulable scriber, for which further details are later disclosed, is positioned over the template with the pin head of the pivotal tracer arm engaged in the choosen Old English character while the fixed guide pin is anchored on the base guideline of the template. The pivotal and lettering pen holding arm is installed with the writing pen of this invention, wherein the pen nib is positioned at a preferable 45 degree angle to the longitudinal straight edge of the receiving surface. The writing pen is detachably secured in the holding arm by a locking screw, while the pivotal holding arm itself and pivotal tracing arm is snugly secured by the scriber locking knurl. Although it has been determined that the pen nib may be positioned at angles of 30 or 60 degrees, the preferred angle is at 45 degrees. The 45 degree angle of the nib has been determined to most effectively account for the variations in thickness inherent to Old English characters. A reproduction of Old English characters having the pen nib set at a 45 degree imparts a neat and attractive appearance of these characters, for which the calligrapher can feel proud.

A better understanding of the subject invention will be enabled when the following written description is read in conjunction with the appended drawings.

BRIEF DESCRIPTION OF THE DRAWINGS

FIG. 2 is a front elevational view showing a simulative use for the lettering system of this invention;

FIG. 3 is an elevational view of the writing pen cap;

FIGS. 4*a* and 4*b* are vertical and isometric views respectively showing the pen ink-reservoir;

FIGS. 5*a* and 5*b* are vertical and isometric views respectively showing the pen container cylinder;

FIG. 6 is a vertical view of the plunger/needle insert that controls the ink flow to the pen nib;

FIGS. 7*a* and 7*b* are side and front views respectively showing the rectangular pen nib embodiment of this invention;

DETAILED DESCRIPTION OF THE INVENTION

Figure 1:
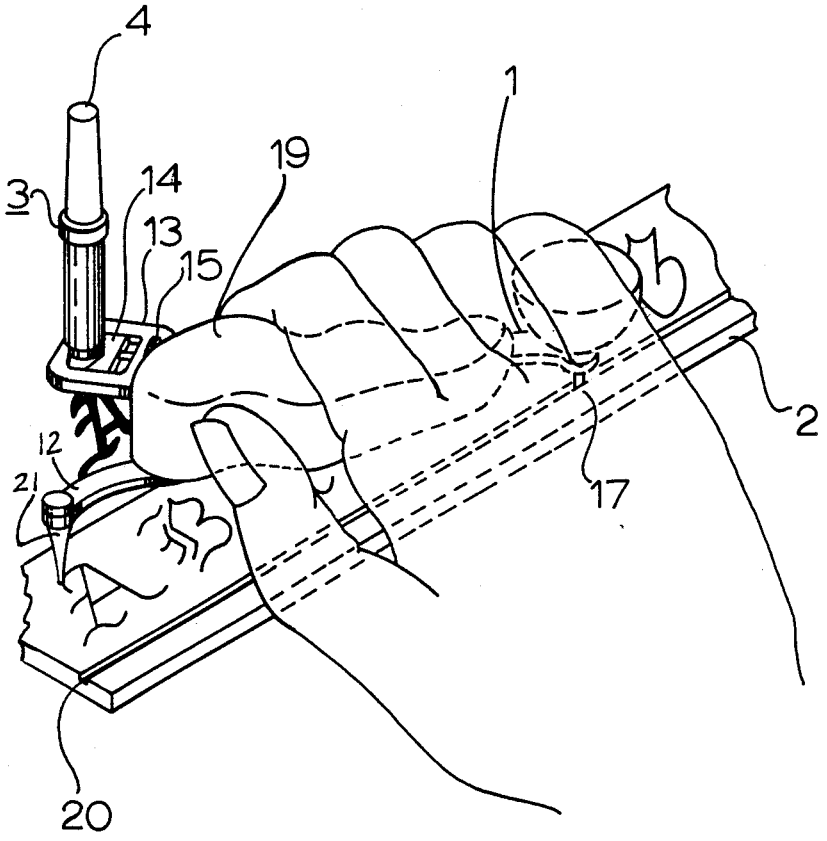
FIG. 1 is a perspective view of a calligraphic lettering system embodying the features of the present invention.

Referring now to the drawings, wherein like numerals refer to like parts throughout the several views, and FIGS. 1 and 2 in particular, illustrate a simulative composite and preferred embodiment of the present invention. FIGS. 1 and 2 illustrate the major construction of this invention which constitutes an Old English template 2 and a hand manipulable scriber 1 containing a writing pen 3.

The lettering guide or template 2 consists of a hardwood or preferably, a plastic elongate rectangular frame having a grooved Old English alphabet intermediately and equidistantly disposed at the frame surface. The template contains a bottom situated and grooved guideline 20 for anchoring the scriber guide pin 17.

The hand manipulable scriber 1, composed of plastic or hardwood material consists of an adjustable guide pin 17 projecting downward to engage the grooved guideline 20 of template 2. Tracer pin 21 is provided to engage a selected letter character and extends downwardly from the end of adjustable arm 12 which is pivotally attached at 22 (not shown) and secured in position by a locking knurl 18. A finger-contoured holder 19 is provided for ease and comfort at maneuvering scriber 1 for extended periods of work. Scriber 1 further consists of a clamping arm 13, equipped to hold writing pen 3. Pen 3 is detachably secured in clamping arm 13 by means of a slideable locking fastener 14 disposed at the end of a screw 16 and locked into position by rotary wheel 15. As shown in FIG. 1, the artisan is able to appreciate the inventive accomplishment at reproducing Old English characters. FIG. 1 shows template 2 disposed with surface/grooved Old English characters that are equilateral, while contrariwise, the Old English characters reproduced thereby, exhibits a beautiful variation in line dimensions. Although the character "A" is particularly disclosed, it is merely representative of the fact that all other members of the Old English alphabet can be reproduced from the thin-line template to exhibit variations in line thickness, a feature owe to the unique pen nibs of this invention.

FIGS. 3 to 7 show the components of the lettering pen 3. Nib 6 contains a plunger 7 having an affixed needle 8 at its lower end, which controls the flow of liquid ink emitted from channel 10. The top end of the nib is in intimate contact with an intermediate and hollow cylinder 5. Cylinder 5 houses the plunger assembly and is contacted with the ink cartridge reservoir 4. Cap 11 is provided for closure and protection of nib 6 when the lettering pen is not in use. The ink feeding channel 10 of nib 6 is indirectly connected with the ink cartridge reservoir 4 through the intermediate capillary feeding cylinder 5.

Inclusion of the intermediate cylinder 5 also serves as a cushioning effect in the delivery of ink and thus, affords a smooth feeding of ink to the writing nib. The rectangular shaped nib, plunger/needle insert, are preferably made of tungsten steel. Although the inventive tungsten steel chisel point nib has demonstrated long life and durability, other substances well known in the art, such as various resins, may be used in lieu thereof.

Figure 8A:
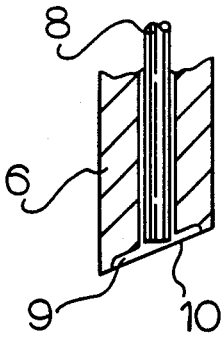
FIGS. 8*a* and 8*b* are transverse sectional views of a side and front view respectively illustrating the plunger/needle inserted into the pen nib.
Figure 8B:
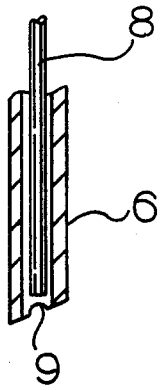
Figure 9:
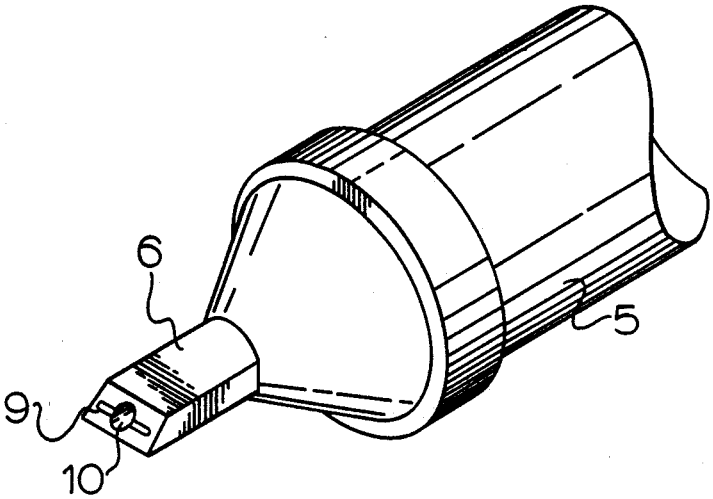
FIGS. 9 and 10 are enlarged end perspective views of the nib embodying the present invention, wherein the bottom groove of the pen nib provides for an improved ink flow that is especially helpful on larger size pen nibs.
Figure 10:
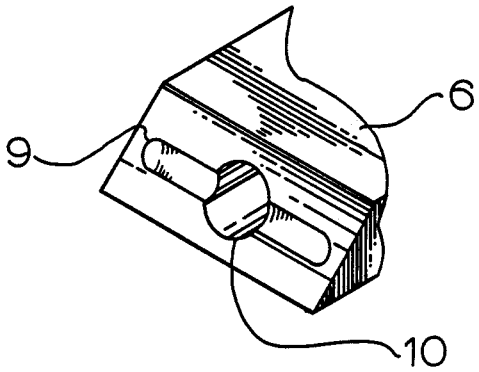

FIG. 8 diagrammatically shows a chisel point nib 6 in accordance with the embodiments of the invention shown in FIGS. 1, 2 and 7. As illustrated in FIG. 8, needle 8 is situated in the capillary channel 10 and serves to smoothly meter out liquid ink via plunger 7 pressing on ink reservoir 4 to release the ink into cylinder 5 wherein gravity directs the ink flow into the channel 10. Similarly, and for more thorough appreciation, FIGS. 9 and 10 illustrate the bottom configuration of nib 6 which shows the semi-ellipsoidal detent 9 being adjacently in receipt of the longitudinally and axially centered bottom end of channel 10. The dynamic force of surface tension achieves an even distribution of liquid ink at detent 9 and further assists in inhibiting ink leakage at the nib tip when writing pressure is released from the writing instrument.

It will, of course, be understood that modifications of the present invention in its various aspects will be apparent to those skilled in the art of calligraphy, some being apparent only after study while others being a matter of routine design. The invention, therefore, should not be seen as rigidly confined to the particular construction and arrangement of parts herein illustrated and described, but embraces all such modified forms thereof as come within the scope of the appended claims.

I claim:

1. A lettering system which facilitates the production of Old English characters on a receiving surface, comprising:

(a) an Old English template having thin lines and being of elongate rectangular shape and having equidistantly situated characters at the frame surface as well as a bottom surface exposed guideline to support a scriber guide pin;

(b) a finger contoured and hand manipulable scriber having a pivotal arm equipped with a downwardly projecting tracer pin at its end, having a pivotal arm with a slideable locking fastener to secure a lettering pen, and both pivotal arms being secured by a screw clamp, and a downwardly projecting guide pin for engaging the template guideline; and (c) a lettering pen having situated at its top end, a cartridge ink reservoir, an intermediately disposed cylinder which houses the ink reservoir plunger, a needle solidly affixed to the plunger at its top end and extended into the pen nib at its bottom end, the improvement in which consists of a rectangular shaped chisel point pen nib equipped with a longitudinally and centrally disposed capillary ink channel that axially terminates at a bottom most semi-ellipsoidal detent in the nib.

2. The lettering system according to claim 1, wherein the chisel point pen nib is composed of tungsten steel material.

3. The lettering system according to claim 1, wherein the pen nib is composed of a resinous material.

* * * * *